UNITED STATES PATENT OFFICE.

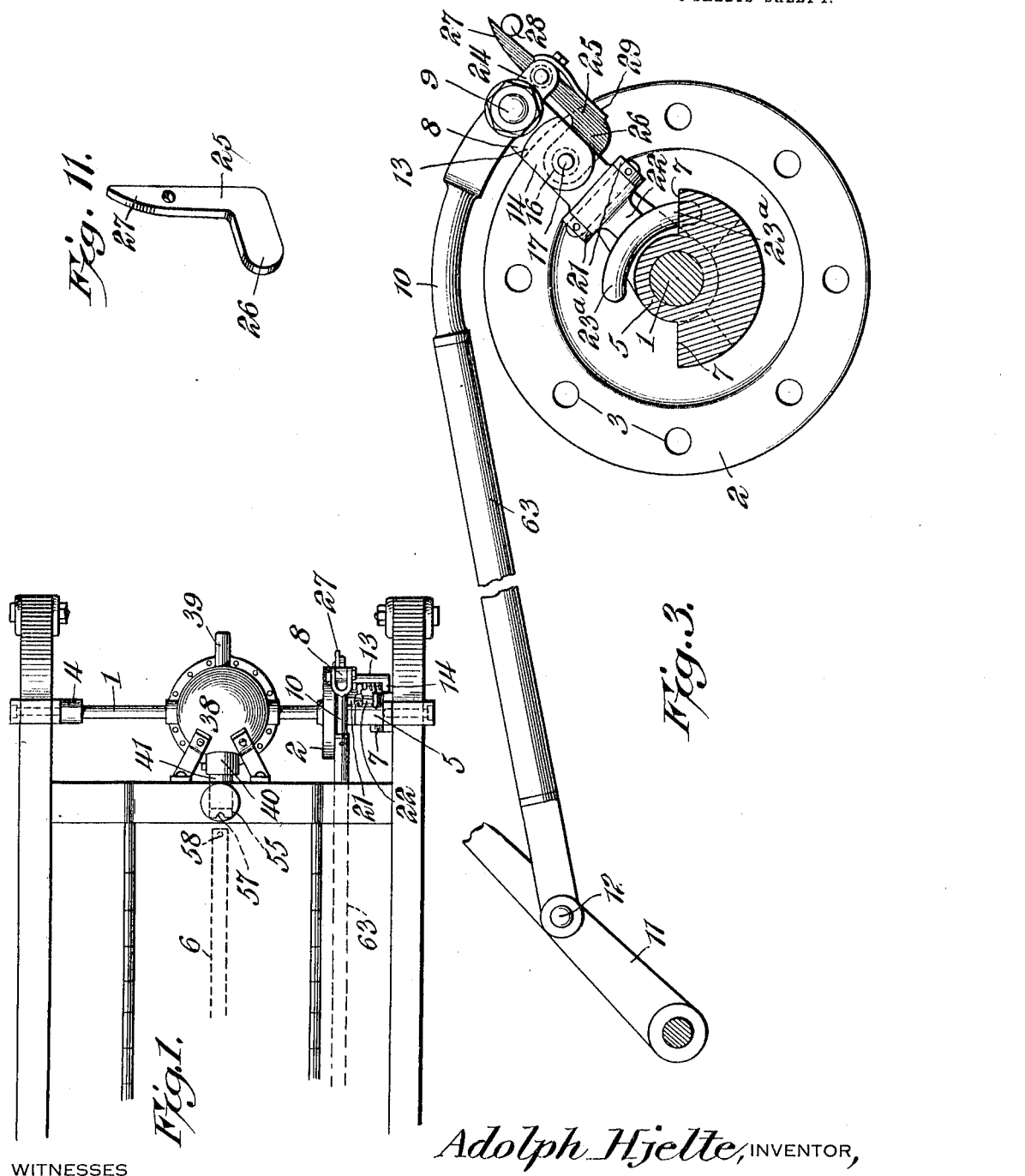

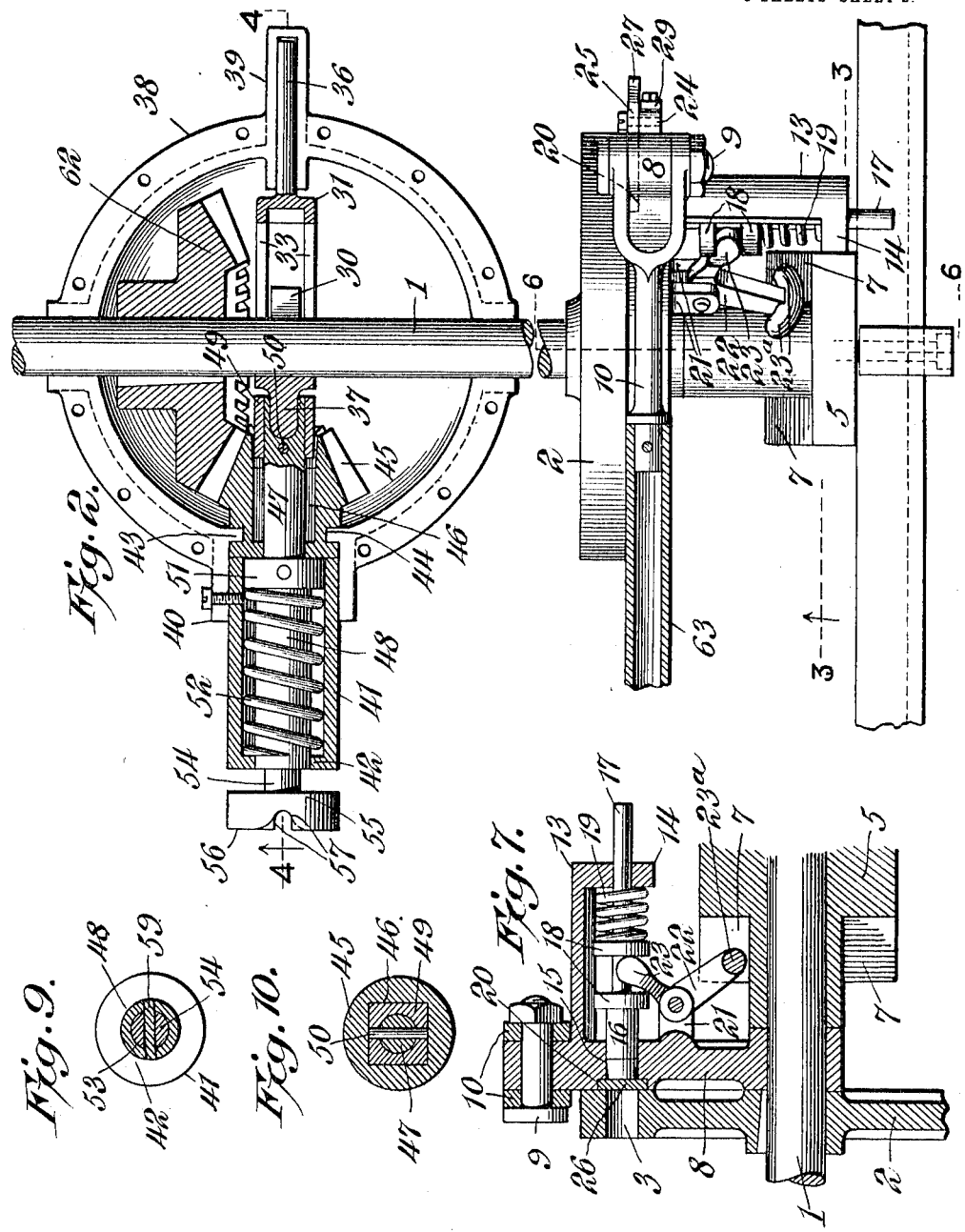

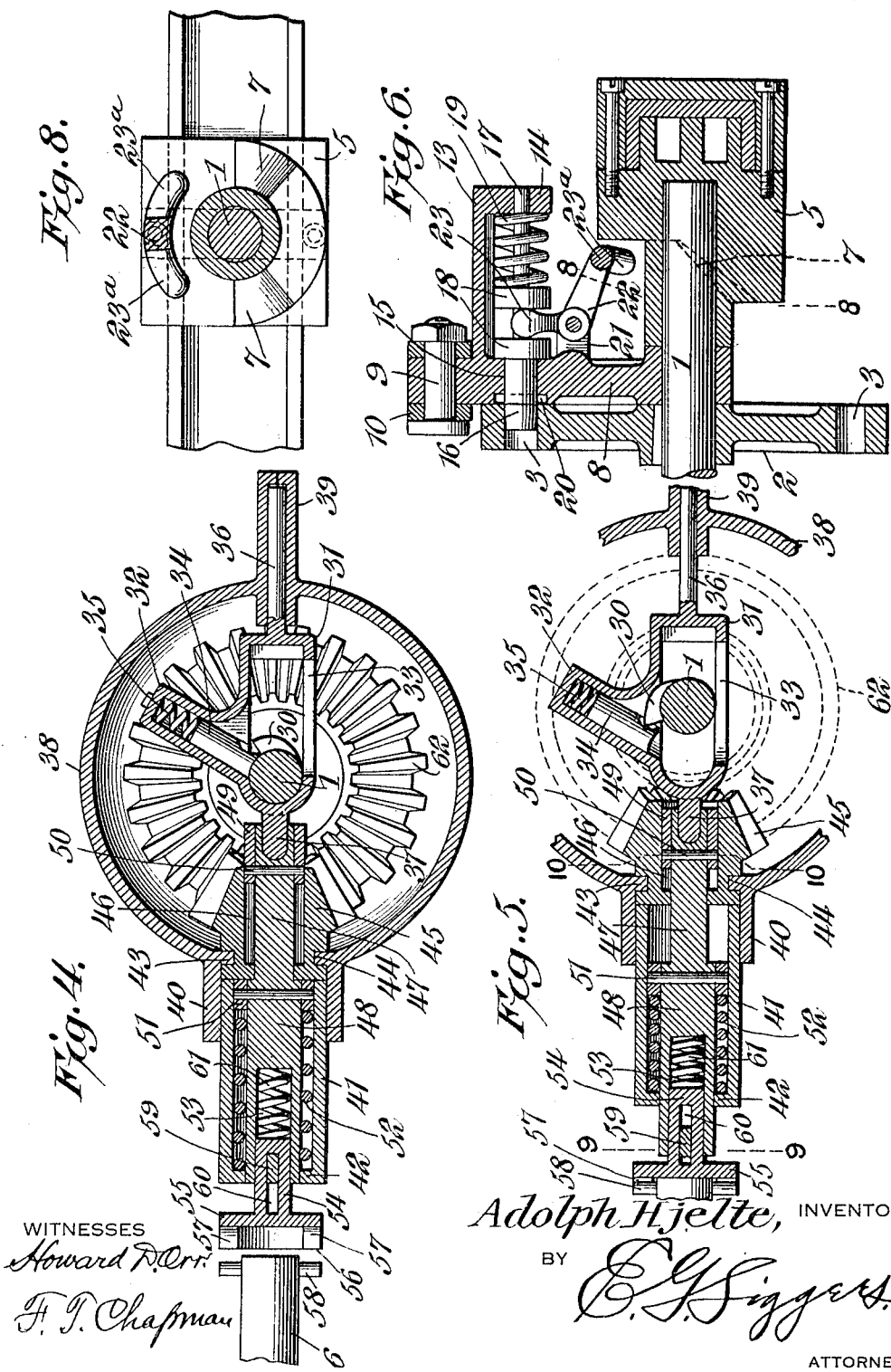
A. HJELTE.
ENGINE STARTER.
APPLICATION FILED OCT. 28, 1912.
1,119,825.
Patented Dec. 8, 1914.
3 SHEETS—SHEET 3.
Adolph Hjelte, INVENTOR,
BY
ATTORNEY

ADOLPH HJELTE, OF CHICAGO, ILLINOIS.

ENGINE-STARTER.

1,119,825.  Specification of Letters Patent.  Patented Dec. 8, 1914.

Application filed October 28, 1912. Serial No. 728,304.

*To all whom it may concern:*

Be it known that I, ADOLPH HJELTE, a citizen of the United States, residing at Chicago, in the county of Cook and State of Illinois, have invented a new and useful Engine-Starter, of which the following is a specification.

This invention has reference to improvements in engine starters designed more particularly for the starting of an explosion engine, especially one mounted upon an automobile, and its object is to provide a device for the purpose which may be readily controlled from the operator's seat of an automobile, and the starting operation may be repeated as often as necessary.

In accordance with the present invention there is located within easy reach of the operator an operating lever connected to a rock member, which in turn carries a latch or coupling mechanism in operative relation to a rotatable member connected through multiplying gearing to a cranking device, which latter upon the active movement of the starter is caused to operate in a manner to connect up with the power shaft of the engine to give it the initial turning impulse.

The invention will be best understood from a consideration of the following detailed description taken in connection with the accompanying drawings forming a part of this specification, with the further understanding that while a practical form of the invention is illustrated in the drawings, it is susceptible of other practical forms, wherefore the invention is not confined to any strict conformity with the showing of the drawings, but may be changed and modified so long as such changes mark no material departure from the salient features of the invention.

In the drawings:—Figure 1 is a plan view of the fore part of an automobile witn the invention attached, only such parts of the automobile being shown as are helpful for an understanding of the present invention. Fig. 2 is a plan view with parts in horizontal section of a part of the structure constituting the present invention and drawn to a larger scale than Fig. 1. Fig. 3 is a section on the line 3—3 of Fig. 2 with distant parts omitted. Fig. 4 is a section on the line 4—4 of Fig. 2. Fig. 5 is a view similar to Fig. 4 but showing a different operative position of the parts and omitting some parts shown in Fig. 4. Fig. 6 is a section on the line 6—6 of Fig. 2. Fig. 7 is a view similar to Fig. 6 but showing a different operative position of the parts. Fig. 8 is a section on the line 8—8 of Fig. 6. Fig. 9 is a section on the line 9—9 of Fig. 5. Fig. 10 is a section on the line 10—10 of Fig. 5 with parts omitted. Fig. 11 is a perspective view of a latch or holding member for the lock pin.

Referring to the drawings, there is shown a shaft 1 constituting the main shaft of the engine starter. Keyed to this shaft is a disk 2 provided near its periphery with a circular series of passages 3 which may or may not extend entirely through the rim, but preferably are extended through the rim to prevent lodgment of interfering matter. The shaft 1 is mounted at the ends in bearings 4, 5, respectively, suitably secured to the framework of the automobile in transverse relation to the longitudinal axis of the crank shaft of the engine, such crank shaft being indicated at 6 without any attempt to show its structure. The bearing 5 has a cam 7 formed thereon or secured thereto for a purpose which will presently appear.

Mounted on the shaft 1 between the disk 2 and the bearing 5 is a rock arm 8 adjacent the disk 2, and capable of moving over one face of this disk for an appropriate distance. This arm 8 is radial to the disk 2 and extends beyond the periphery thereof, where it is connected by means of a pivot bolt 9 to a link 10, the latter being of sufficient length to extend to a lever 11 to which the link is pivoted by means of a pin or bolt 12. The lever 11 is in practice mounted within convenient reach of the operator of the automobile, so as to have a range of travel back and forth parallel to the longitudinal center line of the automobile through an arc of, say, ninety degrees, although practice has demonstrated that this range of travel may be through a smaller arc.

Formed on the arm 8 is an offset bracket 13 having an angle extension 14 directed toward the axis of movement of the arm 8. Traversing the arm 8 in line with any one of the perforations 3 in the disk 2 is a passage 15, so located as to be brought into alinement with any one of the passages 3, and mounted in this passage 15 is a pin 16 having an axial stem 17 of sufficient length to extend through an appropriate passage in the angle portion 14 of the bracket 13. The pin 16 has fast on its stem 17 spaced collars 18, and between one of the collars and the extension 14 the stem is surrounded by a spring 19 tending to force the other collar into engagement with the corresponding face of the arm 8. That face of the arm 8 presented toward the disk 2 is formed with a recess 20 traversing the passage 15.

Formed on the arm 8 on that face remote from the disk 2 and adjacent the pin 16, but nearer to the shaft 1 than said pin, are ears 21 between which is pivoted an angle lever 22 having one end in the form of a fork 23 straddling the stem 17, between the collars 18, while the other arm of this lever terminates in laterally extending toes 23$^a$ in position to engage respective ends of the cam 7. At the outer extremity of the arm 8 are ears 24 between which there is pivoted a plate 25 having an angle extremity 26 adapted to extend into the recess 20, while the other end of the plate beyond the ears 24 is formed into a finger 27 which at one limit of its travel engages a pin 28 mounted on any fixed portion of the structure. A spring 29 carried by the ears 24 tends to move the plate 25 which constitutes a latch or holding member for the pin 16 into the path of the latter, and when the pin 16 is retracted in a manner to be described, the end 26 is moved along the recess 20 until in the path of the pin 16, thereby holding the latter against the action of the spring 19. When the parts are in the position shown in Fig. 3 the pin 28 has engaged the finger 27 and the holding member or plate 25 is so moved that its end 26 is out of the path of the pin 16 and the latter is free to move under the action of the spring 19 into an appropriate passage 3 of the disk 2, thus locking the arm 8 and disk 2 together. If, now, the operator moves the lever 11 toward the left as viewed in Fig. 3, which movement is equivalent in the installed apparatus to a movement of the lever toward the operator from the front of the machine rearwardly, the disk 2 participates in this movement and is rotated until the appropriate toe 23$^a$ of the lever 22 comes into engagement with the corresponding end of the cam 7, when the action of the cam upon the toe 23$^a$ will cause a movement of the lever 22 transmitted through the fork 23 to move the pin 16 against the action of the spring 19 until the pin is entirely withdrawn from the passage 3 into which it had been previously moved and the retracting movement of the pin is sufficient to permit the plate 25 to move under the action of its spring 29 until the end 26 is in the path of the pin, which position it will hold when the lever 11 is moved toward the right, so that the lever 11 and arm 8 may be actuated in the reverse direction without causing a participation of the disk 2 in said movement. If the return movement toward the right, as viewed in Fig. 3, be continued, the finger 27 ultimately engages the pin 28 to cause a withdrawal of the end 26 of the plate or holding member 25 from the path of the pin 16 and the latter is forced into a passage 3 by the spring 19, thus again locking the arm 8 to the disk 2. In this position of the parts the toe 23$^a$ at the right of the lever 22 as viewed in Fig. 3 has not yet been moved operatively into engagement with the corresponding end of the cam 7, for in order to do this the lever 11 must be moved still farther to the right.

The disk 2 and operating means therefor are usually located near one end of the shaft 1, and at a point on said shaft in line with the power shaft 6 of the explosion engine there is mounted a cam 30, and also mounted on the shaft 1 in inclosing relation to the cam 30 is a slide 31 in the form of a frame or cage having a hollow offset 32 at one side, and opposite said offset provided with a longitudinal slot 33. In the offset 32 there is mounted a slidable pin 34 and a spring 35 tending to move the pin toward the interior of the frame 31. At one end the frame 31 is provided with an elongated stem 36 and at the other end with a shorter stem 37.

Mounted on the shaft 1 in surrounding relation to the sliding member 31 is a casing 38 preferably spherical, but not necessarily so, and this casing is provided with a radial extension 39 adapted to receive the stem 36, and diametrically opposite the extension 39 the casing 38 is formed with a hollow neck 40 extending radially from the casing. Fast in and extending from the neck 40 is a sleeve 41 contracted at the outer end, as indicated at 42, and the interior of the neck 40 where joining the casing 38 is also contracted by an annular inwardly directed flange 43 entering a groove 44 in a bevel pinion 45, which latter is formed with an axially directed bore 46 entered by the reduced end 47 of a pin 48, which latter extends axially through the neck 41 and its contracted end 42. The end 47 of the pin 48 is smaller than the bore 46 and receives a sleeve 49, the said sleeve 49 and the bore 46 being non-circular, while the sleeve 49 is made fast to the end 47 by a pin 50, or in any other appropriate manner. The end 47 of the pin 48 may, therefore, slide axially of the pinion 45, but is constrained to rotate with the pinion because of the non-circular character of the bore 46 and sleeve 49. The pin 48 is enlarged at one end, as indicated at 51, as by a ring made fast in any appropriate way to the pin 48, and between this enlargement 51 and the contracted end 42 of the sleeve 41 the pin 48 is surrounded by a spring 52, the normal tendency of which spring is to maintain the pin 48 with the enlargement 51 at the inner end of the sleeve, that is, at the end adjacent the casing 38. The outer end of the pin 48 is formed with an axial bore 53 into which extends a stem 54 provided with a head 55 having a marginal flange 56, in which latter are formed diametrically opposite notches 57 to receive the projecting ends of a pin 58 extending through the corresponding end of the shaft 6 transversely thereof. The stem 54 is traversed by a pin 59 carried by the pin 48 and extending through a longitudinal slot 60 in the pin 54, while a spring 61 is lodged in the bore 53 and tends normally to maintain the stem 54 in the projected position.

Mounted on the shaft 1 within the casing 38 is a bevel gear wheel 62 in mesh with the pinion 45 and the gear wheel 62 is so proportioned to the pinion 45 as to cause the latter to turn an appropriate number of times through each revolution of the gear wheel 62, practice having demonstrated that a relation of these two gears to cause the pinion 45 to rotate twice to one rotation of the gear wheel 62 will answer.

When the parts are in the normal position, the frame 31 is so related to the shaft 1 as to bear against the shaft at that side toward the pin 48. When the shaft 1 is rotated by a manipulation of the lever 11 in the manner already described, this rotative movement is participated in by the gear wheel 62 and also by the cam 30. The rotative movement of the gear wheel 62 imparts a like rotative movement to the pinion 45, but at a higher speed, and the rotation of the pinion 45 is imparted to the pin 48 by the engagement of the sleeve 49 and pinion 45. At the same time the cam 30 has moved with the shaft 1 into engagement with the pin 34 and the slide 31 is moved in the direction of its length to an extent to force the pin 48 longitudinally in a direction to compress the spring 52 and as the pin 48 carries the stem 54 with its head 55 the flange 56 is moved into engagement with the pin 58 on the shaft 6, quickly bringing the notches 57 into matching relation with the pin 58 when the reaction of the spring 61 compressed by the continued movement of the pin 48 after the flange 56 engages the pin 58, causes a movement of the stem 54 to an extent to cause the walls of the notches 57 to move into engaging relation with the pin 58, after which the continued rotative movement of the pinion 45 causes a like rotative movement of the shaft 6, and if the conditions be proper for the purpose, a starting impulse is imparted to the explosion engine, the continued rotation of which will discharge the pin 58 from the notches 57, these notches being inclined at one side as is customary. Suppose, however, that the engine failed to start on the first turning impulse, the operator by moving the lever 11 sufficiently to cause the appropriate toe 23ª to engage that portion of the cam 7 in its path brings about a rocking of the lever 22 in a direction to withdraw the pin 16 from the passage 3 in which it is engaged and the spring 29 thereupon moves the end 26 of the holding member 25 into the path of the pin 16, so that the lever 11 may be returned to its initial position without engagement of the pin 16 in a hole 3 and then the pin may be released in the manner already described to engage another hole 3, so that a second rotative movement may be imparted to the disk 2 and a second starting impulse be imparted to the engine. Because of the continued rotation of the shaft 1 and cam 30 in the same direction by the second movement of the lever 11, the frame 31 will ultimately return to its normal position and then more than one additional rocking of the lever 11 may be necessary to impart additional rotations to the shaft 6, but as the operator is performing no particular work in imparting additional rocking movements to the lever 11 before the shaft 6 is again engaged, the operation is not at all fatiguing. Should the engine for some reason or other back-fire, the reverse movement might possibly pull the lever 11 out of the operator's hand, but as soon as the toe 23ª on the appropriate side of the lever 22 reaches the corresponding portion of the cam 7 the pin 16 is pulled out from engagement with the disk 2 and further movement of the lever 11 is arrested. The toe 23ª at the right hand side of the lever 22, as viewed in Fig. 3, and the corresponding end of the cam 7, therefore, serve as an emergency throw-off for the pin 16, thus preventing damage to the starter structure.

In order to keep the weight and stiffness of the link 10 within reasonable limits without decreasing its strength, the major portion of the link may be in the form of a pipe or tube 63, as best indicated in Figs. 2 and 3.

What is claimed is:—

1. In an engine starter, a longitudinally movable engaging member for the power shaft of the engine, means for moving said member longitudinally into engagement with the engine shaft and at the same time imparting rotative movement to said means, and an actuating means for said last-named means comprising a rotatable disk, a rock lever in operative relation to the disk and mounted for movement about the axis of the disk, connections for imparting movement to the rock lever, means for coupling the rock lever and disk, fixed means at one limit of travel of the rock lever for causing the release of the coupling means to couple the rock lever to the disk, and fixed means at the other limit of travel of the rock lever for causing the actuation of the coupling means to uncouple the rock lever from the disk.

2. In an engine starter, means for engaging the shaft of the engine to impart a starting rotation thereto, and means for actuating said first-named means comprising a rotatable disk, a rock arm having a range of movement in operative relation to the disk about the axis of the latter, means for imparting a rocking movement to said arm, a pin carried by the arm and normally constrained to engage the disk for locking the arm to the disk, and a holding member carried by the arm and movable into holding relation to the pin when out of engagement with the disk.

3. In an engine starter, means for engaging the shaft of the engine to impart a starting rotation thereto, and means for actuating said first-named means comprising a rotatable disk, a rock arm having a range of movement in operative relation to the disk, means for imparting a rocking movement to said arm, a pin carried by the arm and normally constrained to engage the disk for locking the arm to the disk, a holding member carried by the arm and movable into holding relation to the pin when said pin is out of engagement with the disk, an actuating member for the pin for moving it away from the disk and means at each limit of movement of the rock arm and in the path of the pin-actuating member for operating the latter to cause a retractive movement of the pin.

4. In an engine starter, means movable into engagement with the power shaft of the engine for imparting a starting rotation thereto, and an actuating means for said first-named means comprising a disk with a circular series of passages therein, a rock arm adjacent the disk and movable upon the axis of rotation of the disk, a pin mounted on the rock arm and having a normal constraint to enter a passage in the disk, a lever mounted on the rock arm and constructed to engage the pin to move it against its normal constraint, a holding member mounted on the rock arm and having a normal constraint to move into the path of the pin when retracted, and means at opposite ends of travel of the rock arm for engaging the lever thereon to cause the retraction of the pin.

5. In an engine starter, a normally inactive means movable into engagement with the power shaft of the engine to rotate said shaft, and actuating means for said first named means comprising a rotatable disk having a circular series of passages therein, connections between the disk and the first named means, a rock arm mounted for movement about the axis of the disk and in operative relation to said disk, operating connections for the rock arm, a pin mounted on the rock arm and normally constrained to enter a passage in the disk, a holding member having a normal constraint to move into holding relation to the pin transverse of the rock arm, a lever mounted on the rock arm and at one end engaging the pin to retract the same from engagement in a passage in the disk, and actuating means for the lever in the path thereof at the extremities of movement of the rock arm to cause the retraction of the pin.

6. In an engine starter, an elongated engaging device for the engine having a range of longitudinal movement and constructed to elastically yield in the direction of its length, a multiplying gear for imparting rotative movement to the engaging device, said multiplying gear having its members in angular relation, a shaft for actuating the gear and arranged in corresponding angular relation to the longitudinal movement of the engaging device, an impelling device in line with the engine engaging device for imparting longitudinal movement to the latter, means on the shaft for imparting movement to the impelling device to in turn actuate the engaging device, and means for imparting rotative movement to the gear actuating shaft.

7. In an engine starter, an elongated engaging device for the engine, having a range of longitudinal movement into and out of engagement with the crank shaft and constructed to yield in the direction of said movement, a multiplying gear for imparting rotative movement to the engaging device with the members of the gear in angular relation, a shaft for actuating the gear and angularly disposed with reference to the longitudinal movement of the engaging device, a slidable frame or cage surrounding the gear actuating shaft and movable in the same direction of longitudinal movement as the engaging device, and also having a connection with the engaging device to cause its actuation longitudinally, a cam mounted on the gear actuating shaft in operative relation to the cage, an elastically yieldable member carried by the cage in the path of the cam, and means for imparting rotative movement to the gear actuating shaft.

8. In an engine starter, a longitudinally movable pin, a stem carried by the pin and having a longitudinal movement with respect thereto and terminating in an engaging portion for an engine, means for normally constraining the pin to move out lengthwise in one direction, gearing connected to the pin for rotating the same, actuating means for the gearing under the control of an operator, and means controlled by said actuating means for imparting longitudinal movement to the pin in opposition to its normal constraint while being rotated by the gearing.

9. In an engine starter, a rotatable shaft, means under the control of an operator for rotating said shaft, a gear wheel mounted on the shaft, a cam also mounted on the shaft adjacent the gear wheel, a slide mounted on the shaft in operative relation to the cam, a longitudinally movable pin engaged by the slide, a spring acting on the pin to move it in opposition to the movement of the slide under the action of the cam, engine engaging means carried by the pin and a pinion in mesh with the gear wheel and axially mounted with relation to the pin and connected thereto for rotating the pin.

In testimony that I claim the foregoing as my own, I have hereto affixed my signature in the presence of two witnesses.

ADOLPH HJELTE.

Witnesses:
R. H. STIMPLE,
G. H. MILLER.

Copies of this patent may be obtained for five cents each, by addressing the "Commissioner of Patents, Washington, D. C."